Jan. 3, 1928.
N. B. LE DUC
SOUP LADLE
Filed Oct. 20, 1926
1,654,980
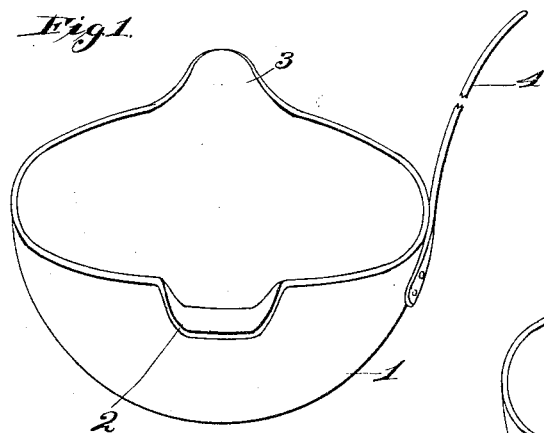
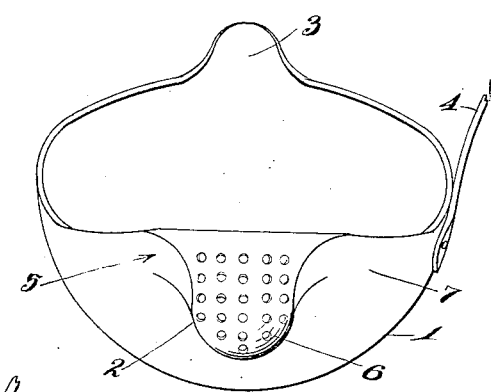
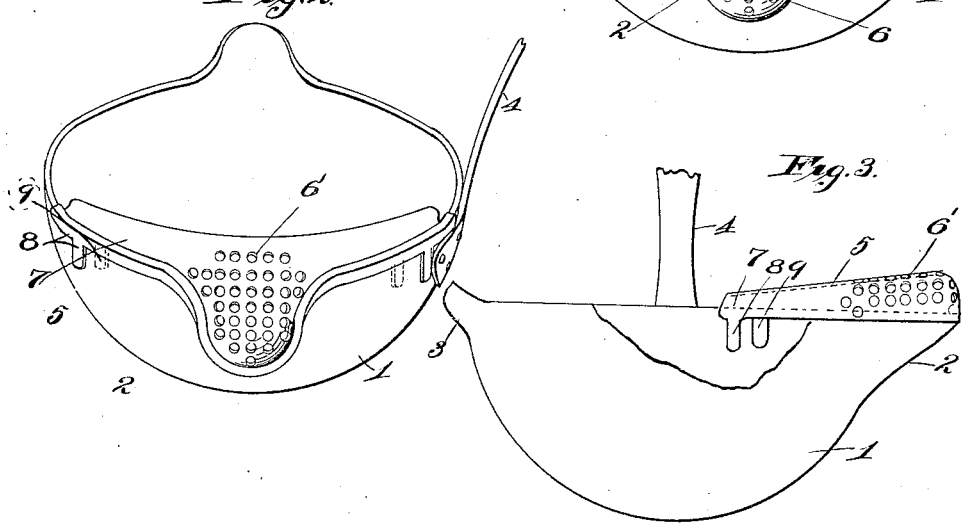
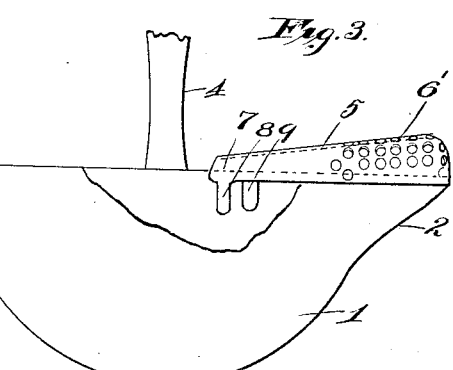
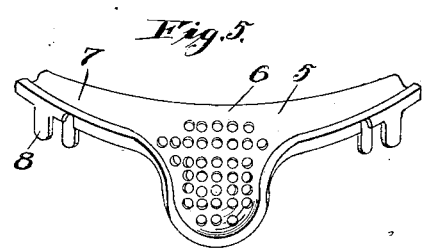
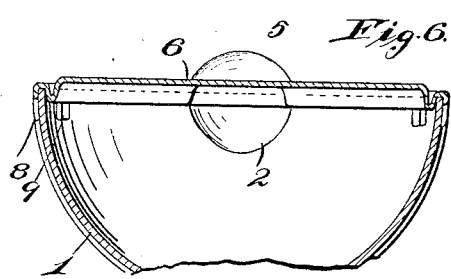
Inventor
Nancy B. Le Duc.
by Hazard and Miller
Attorneys Patented Jan. 3, 1928.

1,654,980

UNITED STATES PATENT OFFICE.

NANCY B. LE DUC, OF PASADENA, CALIFORNIA.

SOUP LADLE.

Application filed October 20, 1926. Serial No. 142,876.

My invention relates to a ladle and in particular to a soup ladle and has for its object a construction whereby the soup may be strained as it is poured out from the delivery spout of the ladle so as to deliver a clear portion of the soup as desired, and also being provided with a delivery spout for the delivery of the more solid portions of the soup.

By such an arrangement the soup may be dished out from the tureen with the same ladle and easily and quickly dispensed in the desired proportion of clear soup and solid matter contained in the soup.

With the above and other objects in view which will appear as the description proceeds, my invention consists in the construction and arrangement of parts hereinafter described and claimed.

Referring to the drawings which form a part of the specification I have shown a preferred form of my invention, and in which Figure 1 is a perspective view of a ladle without the straining attachment;

Fig. 2 shows the same ladle with the straining attachment applied to one of the delivery spouts;

Fig. 3 is a side elevation with parts broken away of the ladle shown in Fig. 2;

Fig. 4 is a modified form of my invention in perspective;

Fig. 5 is a detailed view in perspective of the strainer attachment;

Fig. 6 is a detailed view in section of the strainer attachment.

In the drawings, 1 indicates the bowl soup ladle which is preferably semi-spherical in shape, as shown, and provided with a delivery spout 2 and another delivery spout 3 diagrammatically opposed from spout 2. Midway between the two spouts 2 and 3 is a suitable handle 4. A straining attachment 5 of a shape to fit the delivery spout 2 and the rim for a substantial portion thereof and preferably made of sheet metal, consists of an arched portion 6, the highest point of which is above the outer tip of delivery spout 2. Two tapering flanges 7 extend laterally therefrom in the direction of the rim of bowl 1. The lower portion of the arched member 6 and the flange 7 is channeled, as shown in Fig. 6, so as to fit the rim of the bowl 1 of the delivery spout 2. In order to temporarily hold the strainer attachment 5 in position on the bowl 1 a pair of finger clips 8 and 9 struck out of the same piece of metal as flanges 7 extend downwardly and engage the bowl 1 on opposite sides thereof, clips 8 engaging the outer and clips 9 the inner face of bowl 1. The arched portion 6 is provided with perforations 6'.

In Fig. 4 a modified form of my improved ladle is shown having opposite delivery spouts 2 and 3, but the strainer attachment 5 is integral with the bowl 1, tapering flanges 7 and arched portion 6 being a unit with the bowl 1.

In the use of my ladle the soup or other liquid containing solid portions of varying size can be dished out or dispensed to plates or cups in the desired proportions of solid or liquid parts. The ladle is tipped in the direction of delivery spout 2, causing the solid portions of the soup to be retained in the strainer attachment 5, and only pouring off the clear portion of the soup or other liquid. If a certain amount of solid portion is desired to be placed in the clear portion, it is merely necessary to strain out the clear portion from the ladle back into the tureen, retaining the more solid portions in the ladle and delivering them through the solid delivery spout 3. In this manner the soup or other liquid containing clear liquid and more solid portions may be dispensed easily and conveniently.

Various changes may be made in the details of construction by those skilled in the art, without departing from the spirit of my invention, as claimed.

I claim:

1. A ladle for dispensing a liquid having solid material therein, comprising a semi-cylindrical bowl, a pair of delivery spouts arranged on the rim of the bowl at diametrically opposed points, one of said spouts having a straining member detachably associated with said ladle, said straining member comprising a bridge portion having perforations therein and a reverse flange on one marginal edge thereof, said flange being adapted to follow the contour of the portion of said ladle and engage the same, one reverse portion of said flange extending below the upper periphery of the ladle, and a handle for said ladle.

2. A soup ladle for dispensing liquids having solid materials disposed therein, comprising a semi-spherical body having a pair of outwardly extending delivery spouts arranged at the rim of the bowl at diametrically opposed points, a straining member associated with said ladle, said straining member having a pair of laterally extending wings and an outwardly and downwardly inclined lip portion, said lip portion having perforations therethrough, said wings and lip portion constituting a bridge member overlying one of said spouts and a portion of said ladle, a continuous marginal flange on said wings and lip portion, following the contour of a portion of the periphery of the ladle, said flange having a downwardly extending portion within the ladle, and an inverted U portion adapted to engage the periphery of said ladle as and for the purpose specified.

3. A soup ladle for dispensing liquids having solid materials disposed therein, comprising a semi-spherical body having a pair of outwardly extending delivery spouts arranged at the rim of the bowl at diametrically opposed points, a straining member associated with said ladle, said straining member having a pair of laterally extending wings and an outwardly and downwardly inclined lip portion, said lip portion having perforations therethrough, said wings and lip portion constituting a bridge member overlying one of said spouts and a portion of said ladle, a continuous marginal flange on said wings and lip portion, following the contour of a portion of the periphery of the ladle, said flange having a downwardly extending portion within the ladle, an inverted U portion adapted to engage the periphery of said ladle, and a pair of downwardly extending lugs on each of said wings, said lugs being formed on said flange and adapted to engage frictionally, either side of the upper marginal edge of said ladle.

In testimony whereof I have signed my name to this specification.

NANCY B. LE DUC.